(12) United States Patent
Sung

(10) Patent No.: US 10,365,451 B2
(45) Date of Patent: Jul. 30, 2019

(54) LENS ARRAY AND CAMERA MODULE INCLUDING SAME

(71) Applicant: LG Innotek Co., Ltd., Seoul (KR)

(72) Inventor: Jae Hun Sung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 15 days.

(21) Appl. No.: 15/537,315

(22) PCT Filed: Dec. 15, 2015

(86) PCT No.: PCT/KR2015/013750
§ 371 (c)(1),
(2) Date: Jun. 16, 2017

(87) PCT Pub. No.: WO2016/099127
PCT Pub. Date: Jun. 23, 2016

(65) Prior Publication Data
US 2018/0011280 A1    Jan. 11, 2018

(30) Foreign Application Priority Data

Dec. 17, 2014 (KR) ........................ 10-2014-0182066

(51) Int. Cl.
| | | |
|---|---|---|
| *G02B 7/02* | (2006.01) | |
| *G03B 17/12* | (2006.01) | |
| *G02B 3/00* | (2006.01) | |
| *G02B 7/00* | (2006.01) | |

(52) U.S. Cl.
CPC ............. *G02B 7/02* (2013.01); *G02B 3/0006* (2013.01); *G02B 7/003* (2013.01); *G02B 7/021* (2013.01); *G02B 7/026* (2013.01); *G03B 17/12* (2013.01)

(58) Field of Classification Search
CPC ...... G02B 7/026; G02B 7/021; G02B 3/0006; G02B 7/003; G03B 17/12
See application file for complete search history.

(56) References Cited

U.S. PATENT DOCUMENTS

| | | | |
|---|---|---|---|
| 2007/0031137 A1 | 2/2007 | Bogdan et al. | |
| 2008/0138060 A1 | 6/2008 | Chang | |
| 2014/0254034 A1* | 9/2014 | Lyu | ........................ G02B 7/021 359/819 |

FOREIGN PATENT DOCUMENTS

| | | |
|---|---|---|
| KR | 10-2011-0053693 A | 5/2011 |
| KR | 10-1051533 B1 | 7/2011 |
| KR | 10-2012-0067104 A | 6/2012 |

OTHER PUBLICATIONS

International Search Report in International Application No. PCT/KR2015/013750, filed Dec. 15, 2015.

* cited by examiner

*Primary Examiner* — Alicia M Harrington
(74) *Attorney, Agent, or Firm* — Saliwanchik, Lloyd & Eisenschenk

(57) ABSTRACT

A lens array of an embodiment comprises: a plurality of lenses arranged along an optical axis direction between an object and an image forming plane; a first spacer placed among the plurality of lenses; and an elastic member placed between the lower surface of the first spacer and an upper surface of at least one lens between first and second lenses, which have different widths, face the lower surface of the first spacer, and are arranged side by side along the optical axis direction among the plurality of lenses.

18 Claims, 5 Drawing Sheets

[FIG. 1]
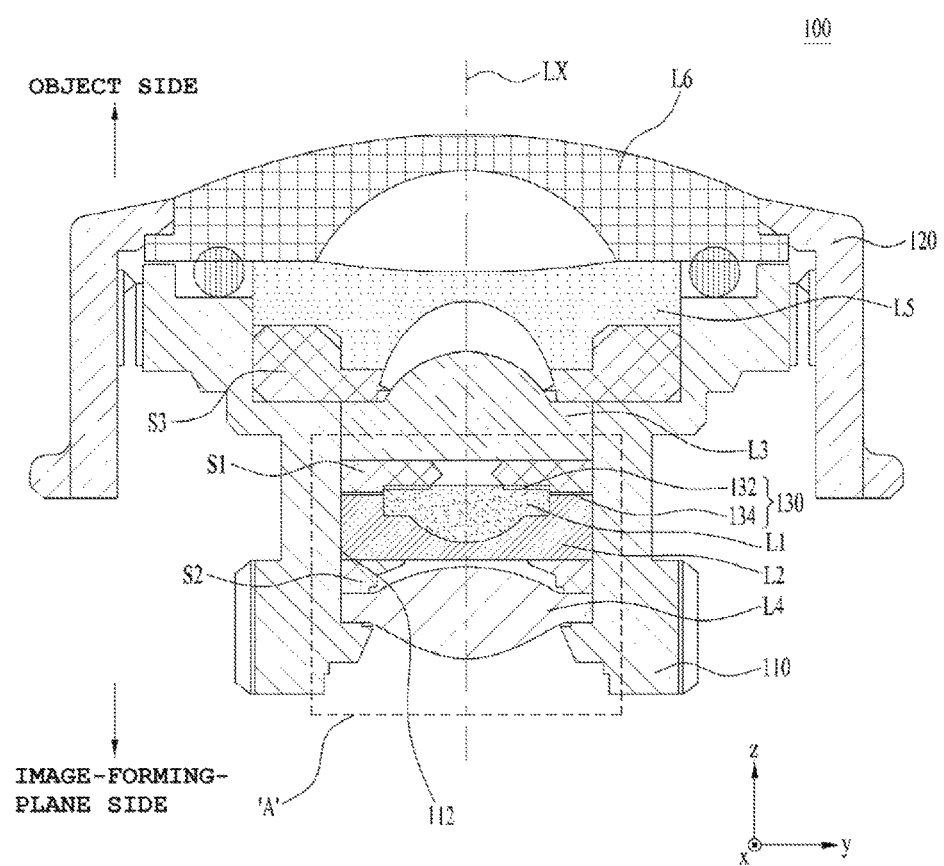

[FIG. 2]
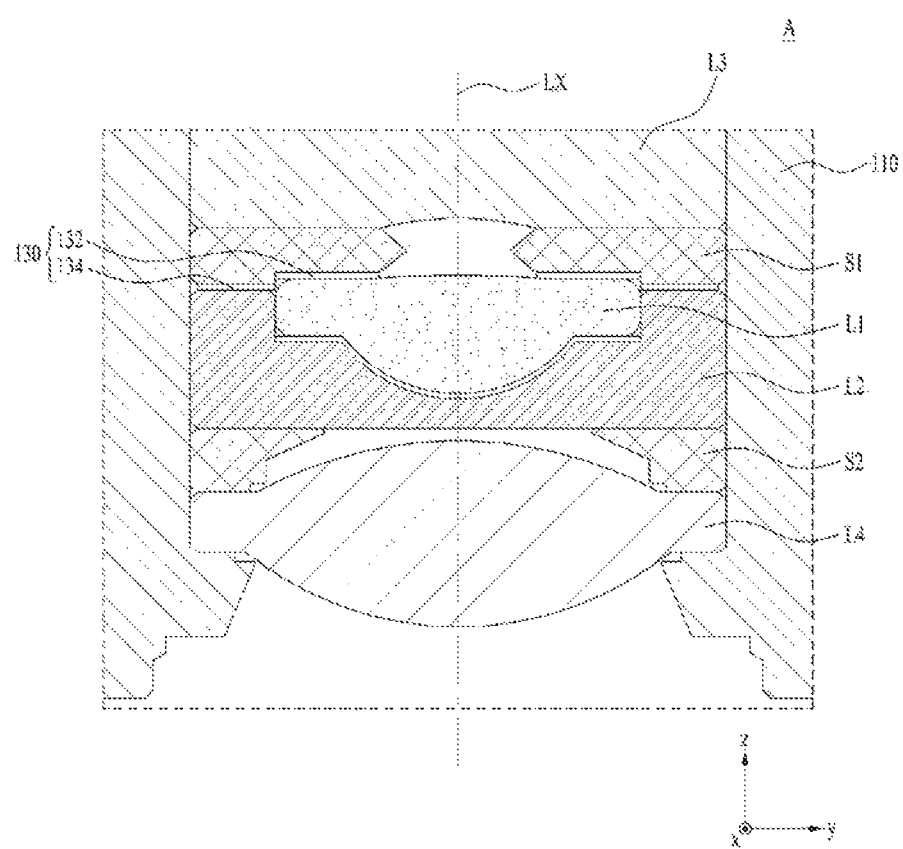

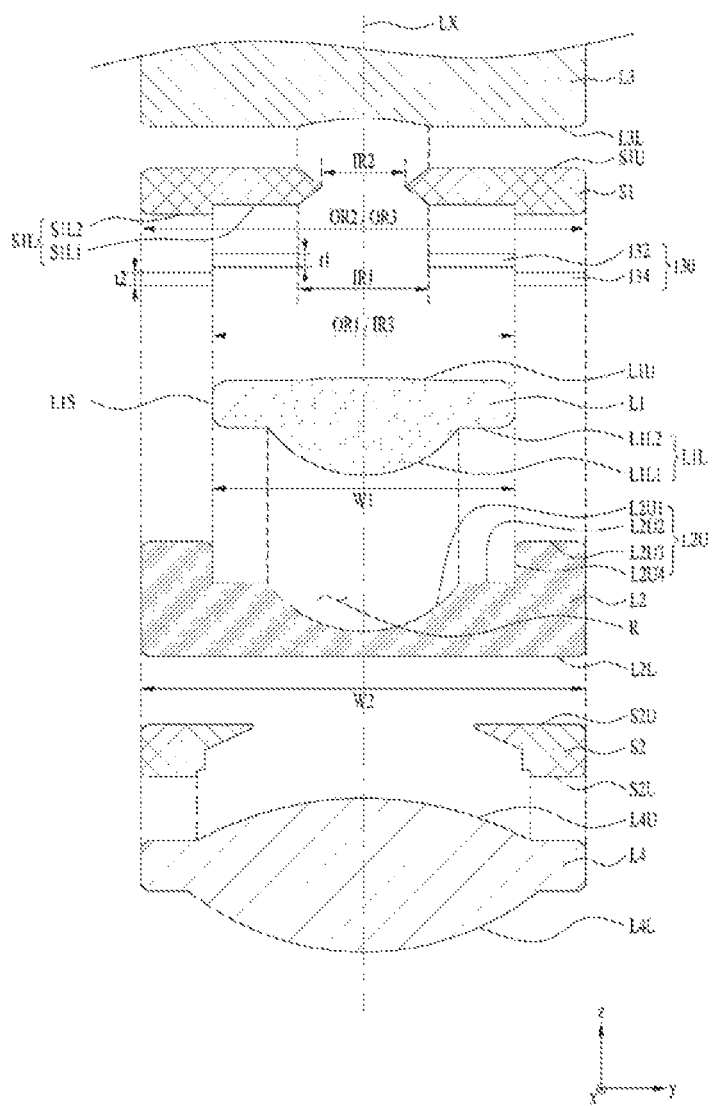
[FIG. 3]

[FIG. 4]
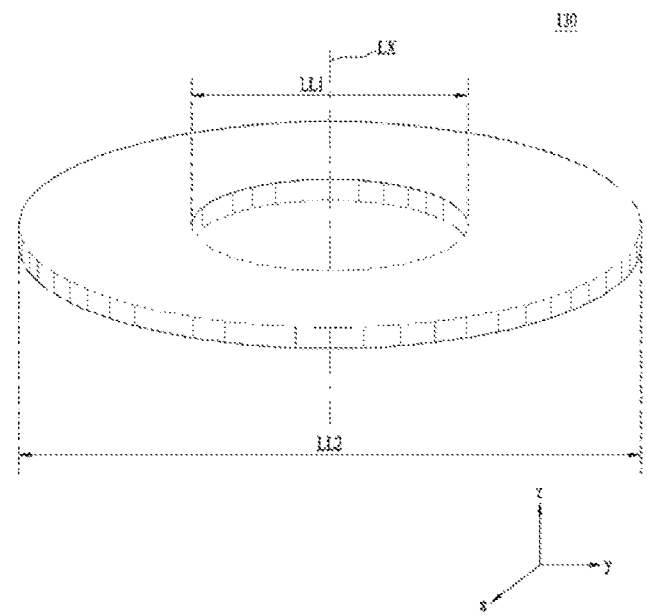
[FIG. 5]
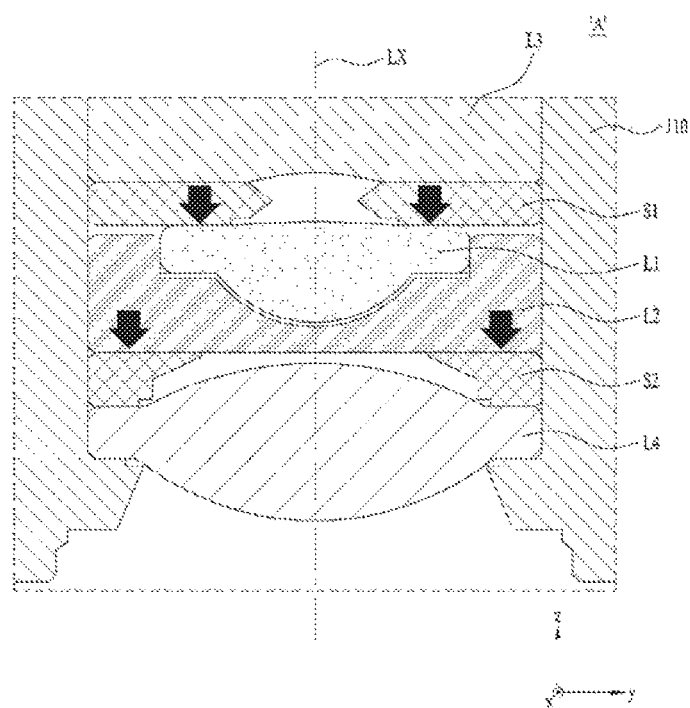

[FIG. 6]
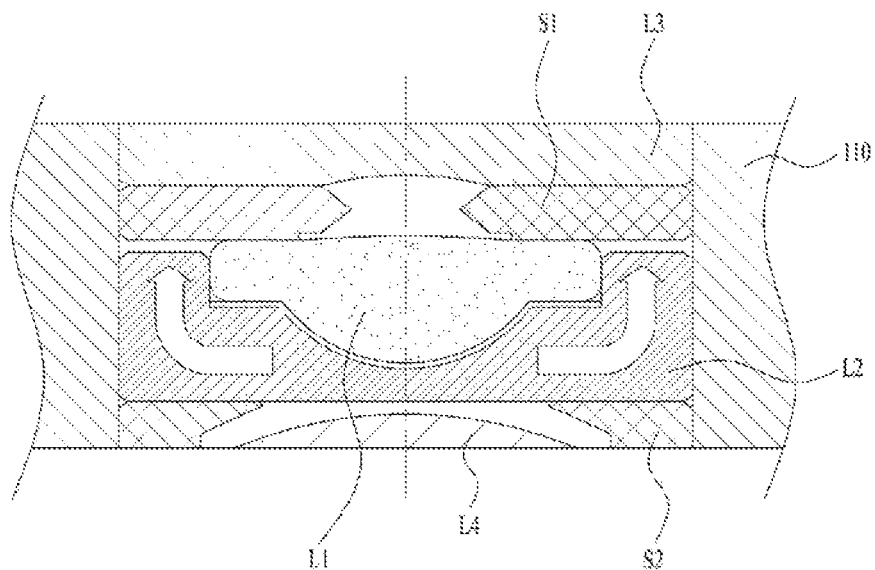

LENS ARRAY AND CAMERA MODULE INCLUDING SAME

CROSS-REFERENCE TO RELATED APPLICATIONS

This application is the U.S. national stage application of International Patent Application No. PCT/KR2015/013750, filed Dec. 15, 2015, which claims priority to Korean Application No. 10-2014-0182066, filed Dec. 17, 2014, the disclosures of each of which are incorporated herein by reference in their entirety.

TECHNICAL FIELD

Embodiments relate to a lens array and a camera module having the same.

BACKGROUND ART

Recently, digital cameras have been mounted in various electronic appliances such as, for example, a vehicle rear camera, a personal computer, a laptop computer, a cellular phone, and a PDA to realize, for example, the storage and transmission of image data and video chatting. Such digital cameras mounted and used in electronic appliances are gradually being reduced in size and weight and are also being reduced in cost.

Accordingly, research is actively underway to implement a high-resolution camera module by appropriately arranging a lens array including multiple lenses. However, when the multiple lenses are assembled in the optical-axis direction, it is difficult to fix the multiple lenses at the same time, which may cause deterioration in the performance and the reliability of the lens array.

Technical Object

Embodiments provide a lens array having improved performance and enhanced reliability and a camera module having the same.

Technical Solution

A lens array according to an embodiment includes a plurality of lenses arranged in an optical-axis direction between an object and an image-forming plane, a first spacer disposed between the lenses, and an elastic member disposed between a lower surface of the first spacer and an upper surface of at least one of first or second lens among the lenses, the first and second lenses facing the lower surface of the first spacer side by side in the optical-axis direction and having different widths.

The width of the first lens may be less than the width of the second lens, and the second lens may include a recessed portion in which the first lens is accommodated.

The lower surface of the first spacer may include a first lower surface facing the upper surface of the first lens, and a second lower surface facing the upper surface of the second lens.

The elastic member may include at least one of a first elastic portion or a second elastic portion, wherein the first elastic portion is disposed between the first lower surface of the first spacer and the upper surface of the first lens, and wherein the second elastic portion is disposed between the second lower surface of the first spacer and the upper surface of the second lens.

The elastic member may have an inner diameter that is greater than an inner diameter of the first spacer and an outer diameter that is equal to or less than an outer diameter of the first spacer.

The lenses may further include a third lens disposed above the first and second lenses, and a fourth lens disposed under the second lens.

The lens array may further include a second spacer disposed between the second lens and the fourth lens.

The elastic member may have a thickness represented as follows:

$$T > d$$

(where, T is the thickness of the elastic member, and d is a tolerance between the lower surface of the first spacer and the upper surface of the first or second lens). The elastic member may include at least one of silicon, rubber, or epoxy.

The elastic member may have a compressible amount ranging from 10% to 50% of a thickness of the elastic member.

The elastic member may have an elastic force that is equal to or greater than a weight of the first and second lenses.

The elastic member may include a material that absorbs and transmits light.

The lens array may further include a coating layer configured to coat at least a portion of the elastic member.

The first elastic portion may be fastened to or via an adhesive coupled to at least one of the first lower surface of the first spacer or the upper surface of the first lens.

The second elastic portion may be fastened to or via an adhesive coupled to at least one of the second lower surface of the first spacer or the upper surface of the second lens.

The upper surface of the second lens may be fixed to the second lower surface of the first spacer, and the elastic member may be fixed to the upper surface of the first lens.

A camera module according to another embodiment includes the lens array, a lens barrel in which the lenses are disposed, and a housing in which the lens barrel is mounted.

The second lower surface may be shaped to surround the first lower surface in a plan view. The first spacer may be formed of a metal or a plastic.

The lenses may further include a fifth lens disposed above the third lens, and the lens array may further include a third spacer disposed between the third lens and the fifth lens.

Advantageous Effects

A lens array and a camera module having the same according to embodiments have improved performance and enhanced reliability through the use of an elastic member.

DESCRIPTION OF DRAWINGS

FIG. 1 is a cross-sectional view of a camera module according to an embodiment.

FIG. 2 is an enlarged and unexploded cross-sectional view of portion "A" illustrated in FIG. 1.

FIG. 3 is an exploded cross-sectional view of a lens array in the portion "A" illustrated in FIG. 2.

FIG. 4 is a perspective view illustrating an embodiment of an elastic member illustrated in FIGS. 1 to 3.

FIG. 5 is a cross-sectional view illustrating a portion of a camera module of a comparative example corresponding to the portion "A" illustrated in FIG. 1.

FIG. 6 is an enlarged cross-sectional view of a portion of the camera module illustrated in FIG. 5.

BEST MODE

Hereinafter, embodiments will be described in detail with reference to the accompanying drawings, in order to concretely describe the disclosure and to assist in understanding of the disclosure. However, the embodiments disclosed here may be altered into various other forms, and the scope of the disclosure should not be construed as being limited to the embodiments. The embodiments disclosed here are provided in order to more completely describe the disclosure to those of ordinary skill in the art.

In the description of the embodiments, when an element is referred to as being formed "on" or "under" another element, it can be directly "on" or "under" the other element or be indirectly formed with intervening elements therebetween. It will also be understood that "on" or "under" the element may be described relative to the drawings.

In addition, relative terms such as, for example, "first", "second", "on/upper/above" and "beneath/lower/below", used in the following description may be used to distinguish any one substance or element with another substance or element without requiring or containing any physical or logical relationship or sequence between these substances or elements.

In the drawings, the size of each layer (or each portion) may be exaggerated, omitted or schematically illustrated for clarity and convenience. In addition, the size of each element does not wholly reflect an actual size thereof. In addition, the same reference numerals indicate the same elements throughout the description of the drawings.

FIG. 1 is a cross-sectional view of a camera module 100 according to an embodiment, FIG. 2 is an enlarged and unexploded cross-sectional view of portion "A" illustrated in FIG. 1, and FIG. 3 is an exploded cross-sectional view of a lens array (or a lens assembly) in the portion "A" illustrated in FIG. 2.

The camera module 100 illustrated in FIG. 1 may include a lens array, a lens barrel 110, and a housing 120.

The lens barrel 110 serves to accommodate the lens array therein, and to this end, may include an accommodating recess 112 configured to accommodate the lens array therein. The accommodating recess 112 may have a shape corresponding to the lens array. The accommodating recess 112 may have a circular plan shape when viewed from an image-forming-plane side. The outer rim of the accommodating recess 112 may have a circular or square shape. That is, the lens barrel 110 may have the shape of a square barrel.

The housing 120 serves to accommodate the lens barrel 110 and the lens array therein. Although not illustrated, a sensor unit, an infrared-blocking filter, and a cover glass may further be provided between a fourth lens L4 and an image-forming plane. In addition, although not illustrated, the housing 120 may be fixed and fastened to a substrate. Here, the infrared-blocking filter may filter introduced infrared rays and may block light having an excessively long wavelength introduced into the sensor unit. The infrared-blocking filter may be formed by alternately depositing titanium oxide and silicon oxide on an optical glass. In order to block infrared rays, the thicknesses of the titanium oxide and the silicon oxide may be adjusted. The sensor unit may include a CCD image sensor or a CMOS image sensor, and serves to convert an introduced image into electrical signals.

Although the housing 120 may be formed of a plastic or a metal and may have the shape of a square barrel, the embodiment is not limited as to the material or shape of the housing 120.

The camera module 100 illustrated in FIG. 1 is merely given to assist in the understanding of the lens array according to the embodiment, and the lens array according to the embodiment may be applied to various fields other than the camera module. In addition, the camera module 100 according to the embodiment is not limited to the cross-sectional shape illustrated in FIGS. 1 to 3. That is, the lens barrel 110 and the housing 120 illustrated in FIG. 1 may have various other shapes.

Meanwhile, the lens array may be disposed in the accommodating recess 112 in the lens barrel 110, and may include first to sixth lenses L1 to L6, first to third spacers S1 to S3, and an elastic member 130.

For convenience of description, although the lens array has been described as including six lenses L1 to L6, the following description may be directly applied even when the lens array according to the embodiment includes a greater or smaller number of lenses than six.

Although the respective lenses L1 to L6 included in the lens array may have a circular plan shape or a polygonal plan shape, the embodiment is not limited as to the particular plan shape of the respective lenses. The sixth, the fifth, the third, the first, the second, and the fourth lenses L6, L5, L3, L1, L2 and LA may be sequentially arranged in a direction from an object side toward an image-forming plane.

The first to sixth lenses L1 to L6 included in the lens array are arranged in the z-axis direction, which is the optical-axis (LX) direction, between an object (not illustrated) and an image-forming plane (not illustrated). Here, although not illustrated, the object may be disposed at the object side on the optical axis, and the image-forming plane may be disposed under the fourth lens L4.

Although each lens included in the lens array may be formed of a metal or a plastic, the embodiment is not limited as to the material of each lens.

The first to sixth lenses L1 to L6 included in the lens array illustrated in FIG. 1 may have a symmetrical cross-sectional shape about the optical axis LX.

First, the first lens L1 and the second lens L2 face an S-$1^{st}$ lower surface S1L of the first spacer S1 side by side in the z-axis direction, which is the optical-axis LX direction. In addition, the first lens L1 may have a first width W1 and the second lens L2 may have a second width W2, and the first width W1 and the second width W2 may differ from each other.

A first upper surface L1U of the first lens L1 may have a flat cross-sectional shape, and a first lower surface L1L of the first lens L1 may include 1-$1^{st}$ and 1-$2^{nd}$ lower surfaces L1L1 and L1L2. The 1-$1^{st}$ lower surface L1L1 of the first lens L1 may have a convex cross-sectional shape toward the image-forming-plane side on the optical axis LX. The 1-$2^{nd}$ lower surface L1L2 of the first lens L1 may be disposed around the 1-$1^{st}$ lower surface L1L1 and may have a flat cross-sectional shape.

In addition, the second lens L2 may include a recessed portion R in which the first lens L1 is accommodated. That is, the 1-$1^{st}$ lower surface L1L1 of the first lens L1 may be accommodated in the recessed portion R. Here, the recessed portion R may be disposed on the optical axis LX, and in the case of FIGS. 1 to 3, the recessed portion R may have a shape suitable for accommodating the lower portion of the first lens L1. That is, the radius of curvature of the recessed portion R may be the same as the radius of curvature of the 1-1$^{st}$ lower surface L1L1 of the first lens L1.

A second upper surface L2U of the second lens L2 may include 2-1$^{st}$ to 2-4$^{th}$ upper surfaces L2U1, L2U2, L2U3 and L2U4. The 2-1$^{st}$ upper surface L2U1 of the second lens L2 is a portion that forms the above-described recessed portion R. The 2-2$^{nd}$ upper surface L2U2 faces the 1-2$^{nd}$ lower surface L1L2 of the first lens L1. The 2-3$^{rd}$ upper surface L2U3 faces a second elastic portion 134 of the elastic member 130 (or the S-1$^{st}$ lower surface SL1 of the first spacer S1 when the second elastic portion 134 is omitted). The 2-4$^{th}$ upper surface L2U4 faces a side surface L1S of the first lens L1.

In addition, the third lens L3 is disposed above the first and second lenses L1 and L2. In the third lens L3, the central portion of a third upper surface thereof located on the optical axis LX may have a convex cross-sectional shape toward the object side, and a third lower surface thereof may have a flat cross-sectional shape toward the image-forming-plane side.

In addition, the fourth lens L4 is disposed under the second lens L2. In the fourth lens L4, a fourth upper surface L4U thereof may have a convex cross-sectional shape toward the object side, and a fourth lower surface L4L thereof may have a convex cross-sectional shape toward the image-forming-plane side.

In addition, although the fifth lens L5 has a concave cross-sectional shape toward the object side, the embodiment is not limited thereto. That is, according to another embodiment, a fifth upper surface of the fifth lens L5 toward the object side may have one or more aspherical inflection points. In addition, a fifth lower surface of the fifth lens L5 toward the image-forming-plane side may have a concave cross-sectional shape.

In addition, a sixth upper surface of the sixth lens L6 toward the object side may have a convex cross-sectional shape and a sixth lower surface toward the image-forming-plane side may have a concave cross-sectional shape.

Meanwhile, in the lens array, the spacers are disposed between the lenses and serve to maintain the distance between the lenses. For example, the lens array illustrated in FIGS. 1 to 3 may include the first to third spacers S1 to S3.

The first spacer S1 is disposed between the first lens L1 and the third lens L3 and between the second lens L2 and the third lens L3. An S-1$^{st}$ upper surface S1U of the first spacer S1 faces the third lower surface L3L of the third lens L3. The S-1$^{st}$ lower surface S1L of the first spacer S1 may include an S-1-1$^{st}$ lower surface S1L1 and an S-1-2$^{nd}$ lower surface S1L2. The S-1-1$^{st}$ lower surface S1L1 is the portion that faces the first upper surface L1U of the first lens L1, and the S-1-2$^{nd}$ lower surface S1L2 is the portion that faces the 2-3$^{rd}$ upper surface L2U3 of the second lens L2.

The second spacer S2 is disposed between the second lens L2 and the fourth lens L4. An S-2$^{nd}$ upper surface S2U of the second spacer S2 faces the second lower surface L2L of the second lens L2. In addition, an S-2$^{nd}$ lower surface S2L of the second spacer S2 faces the fourth upper surface L4U of the fourth lens L4.

The third spacer S3 may be disposed between the third lens L3 and the fifth lens L5 and between a stepped portion of the lens barrel 110 and the fifth lens L5.

Each of the spacers S1 to S3 may be manufactured such that the inner diameter thereof is similar to the effective diameter of a neighboring lens thereof. In addition, although the respective spacers S1 to S3 may be formed of a metal or a plastic, the embodiment is not limited as to the material of the respective spacers S1 to S3.

Meanwhile, the elastic member 130 of the lens array according to the embodiment may be disposed between the upper surface of at least one of the first or second lens L1 or L2 and the S-1$^{st}$ lower surface S1L of the first spacer S1.

According to one embodiment, as illustrated in FIGS. 1 to 3, the elastic member 130 may include both a first elastic portion 132 and the second elastic portion 134. Here, the first elastic portion 132 may be disposed between the S-1-1$^{st}$ lower surface S1L1 of the first spacer S1 and the first upper surface L1U of the first lens L1. In addition, the second elastic portion 134 may be disposed between the S-1-2$^{nd}$ lower surface S1L2 of the first spacer S1 and the 2-3$^{rd}$ upper surface L2U3 of the second lens L2. In this case, the first elastic portion 132 may be fixed to the first upper surface L1U of the first lens L1, and the second elastic portion 134 may be fixed to the 2-3$^{rd}$ upper surface L2U3 of the second lens L2. Accordingly, through the arrangement of the first and second elastic portions 132 and 134, the first and second lenses L1 and L2 may be fixed at the same time.

According to another embodiment, unlike the illustration of FIGS. 1 to 3, the elastic member 130 of the lens array may include only the first elastic portion 132, and may not include the second elastic portion 134. In this case, the 2-3$^{rd}$ upper surface L2U3 of the second lens L2 may be fixed to the S-1-2$^{nd}$ lower surface S1L2 of the first spacer S1, and the first elastic portion 132 may be fixed to the first upper surface L1U of the first lens L1. Accordingly, through the arrangement of the first elastic portion 132, the first and second lenses L1 and L2 may be fixed at the same time.

According to still another embodiment, the elastic member 130 of the lens array may include only the second elastic portion 134, and may not include the first elastic portion 132. In this case, the first upper surface L1U of the first lens L1 may be fixed to the S-1-1$^{st}$ lower surface S1L1 of the first spacer S1, and the second elastic portion 134 may be fixed to the 2-3$^{rd}$ upper surface L2U3 of the second lens L2. Accordingly, through the arrangement of the second elastic portion 134, the first and second lenses L1 and L2 may be fixed at the same time.

In addition, the first elastic portion 132 of the elastic member 130 may be fastened to or may be coupled via an adhesive to at least one of the S-1-1$^{st}$ lower surface S1L1 of the first spacer S1 or the first upper surface L1U of the first lens L1.

In addition, the second elastic portion 134 may be fastened to or may be coupled via an adhesive to at least one of the S-1-2$^{nd}$ lower surface S1L2 of the first spacer S1 or the 2-3$^{rd}$ upper surface L2U3 of the second lens L2.

FIG. 4 is a perspective view illustrating an embodiment of the elastic member 130 illustrated in FIGS. 1 to 3.

The elastic member 130 illustrated in FIG. 4 may correspond to the perspective view of the first or second elastic portion 132 or 134.

Alternatively, the elastic member 130 illustrated in FIG. 4 may correspond to each of the first and second elastic portions 132 and 134. In this case, a third elastic portion (not illustrated) may be disposed at a stepped portion between the first and second elastic portions 132 and 134.

When the elastic member 130 illustrated in FIG. 4 corresponds to the first elastic portion 132, the inner diameter LL1 or IR1 of the first elastic portion 132 may be greater than the inner diameter IR2 of the first spacer S1. In addition, the outer diameter LL2 or OR1 of the first elastic portion 132 may be less than the outer diameter OR2 of the first spacer S1.

In addition, when the elastic member 130 illustrated in FIG. 4 corresponds to the second elastic portion 134, the inner diameter LL1 or IR3 of the second elastic portion 134 may be greater than the inner diameter IR2 of the first spacer S1. In addition, the outer diameter LL2 or OR3 of the second elastic portion 134 may be equal to the outer diameter OR2 of the first spacer S1.

As such, the inner diameter LL1, IR1 and IR3 of the elastic member 130, 132 and 134 may be greater than the inner diameter IR2 of the first spacer S1, and the outer diameter LL2, OR1 and OR3 of the elastic member 130, 132 and 134 may be equal to or less than the outer diameter OR2 of the first spacer S1.

In addition, the thickness T of the elastic member 130, i.e. the respective thicknesses t1 and t2 of the first and second elastic portions 132 and 134 may be represented by the following Equation 1.

$$t1 > d, t2 > d \qquad \text{Equation 1}$$

Here, "t1" and "t2" are the respective thicknesses of the first and second elastic portions 132 and 134, and "d" is the tolerance between the S-$1^{st}$ lower surface S1L of the first spacer S1 and the first upper surface L1U of the first lens L1 (or the second upper surface L2U of the second lens L2). Specifically, the thickness t1 of the first elastic portion 132 is greater than the tolerance d between the S-1-$1^{st}$ lower surface S1L of the first spacer S1 and the first upper surface L1U of the first lens L1. In addition, the thickness t2 of the second elastic portion 134 is greater than the tolerance d between the S-1-$2^{nd}$ lower surface S1L2 of the first spacer S1 and the 2-$3^{rd}$ upper surface L2U3 of the second lens L2.

In addition, the elastic member 130, 132 and 134 may include a material that absorbs and transmits light. For example, the elastic member 130, 132 and 134 may include at least one of silicon, rubber, or epoxy.

In addition, the compressible amount of the elastic member 130, 132 and 134 may respectively range from 10% to 50% of the thickness T, t1 and t2 of the elastic member 130, 132 and 134. When the compressible amount of the elastic member 130, 132 and 134 is below 10%, the elastic member 130, 132 and 134 may not properly perform the role thereof.

In addition, the elastic force of the elastic member 130, 132 and 134 may be equal to or greater than the weight of the first and second lenses L1 and L2.

In addition, a coating layer (not illustrated) may be further provided to coat at least a portion of the elastic member 130, 132 and 134. When at least a portion of the elastic member 130, 132 and 134 is coated using the coating layer, the degree to which the elastic member 130, 132 and 134 absorbs light and transmits the light may be adjusted.

In addition, the elastic member 130, 132 and 134 may itself have light absorption and transmission properties.

FIG. 5 is a cross-sectional view illustrating a portion of a camera module of a comparative example corresponding to the portion "A" illustrated in FIG. 1, and FIG. 6 is an enlarged cross-sectional view of a portion of the camera module illustrated in FIG. 5.

The camera module illustrated in FIG. 5 includes a lens array and the lens barrel 110. Here, the lens array includes first to fourth lenses L1 to L4 and first and second spacers S1 and S2. That is, the lens array according to the comparative example illustrated in FIG. 5 does not include the elastic member 130 illustrated in FIGS. 1 to 4.

In FIG. 5, the first to fourth lenses L1 to L4 and the first and second spacers S1 and S2 are assumed to perform the same function as the first to fourth lenses L1 to L4 and the first and second spacers S1 and S2 illustrated in FIGS. 1 to 3, respectively.

Referring to FIG. 5, in the process of assembling the first to fourth lenses L1 to L4 in the optical-axis LX direction, force is applied to the surfaces of the respective lenses L1 to L4 in different directions as represented by the arrows. Accordingly, as illustrated in FIG. 6, when different forces are applied in the different directions represented by the arrows, there is the possibility of the upper portion of the second lens L2 becoming deformed. Specifically, when only one of the first and second lenses L1 and L2 (e.g. the first lens L1) is fixed, deformation may occur at the surface of the other lens, which is not fixed (e.g. the second lens L2). That is, in the process of assembling multiple lenses, it is difficult to fix the two first and second lenses L1 and L2 at the same time due to the manufacturing tolerance of the first spacer S1. Thereby, the performance of the lens array may be deteriorated and the reliability thereof may be reduced.

In consideration of this, in the case of the lens array according to the embodiment, the elastic member 130 is disposed between the first spacer S1 and at least one of the first or second lens. Accordingly, as illustrated in FIG. 2, when the lenses are assembled, the thicknesses t1 and t2 of the elastic member 130 may be reduced so as to fix the first and second lenses L1 and L2 at the same time, which may allow force to be applied to the respective lenses in the same direction, as represented by the arrows. Accordingly, the two lenses L1 and L2 may be fixed at the same time. Thereby, the performance of the lens array may be improved and the reliability thereof may be enhanced.

The lens array and the camera module including the same according to the embodiment may typically be applied to various electronic appliances such as, for example, a vehicle rear camera, a personal computer, a laptop computer, a cellular phone, and a PDA.

The above description merely describes the technical sprit of the embodiments by way of example, and various modifications and substitutions related to the above description are possible by those skilled in the art without departing from the scope and spirit of the disclosure. Accordingly, the disclosed embodiments are provided for the purpose of description and are not intended to limit the technical scope of the disclosure, and the technical scope of the disclosure is not limited by the embodiments. The range of the disclosure should be interpreted based on the following claims, and all technical ideas that fall within the range equivalent to the claims should be understood as belonging to the scope of the disclosure.

MODE FOR INVENTION

Various embodiments have sufficiently been described in the best mode to implement the disclosure.

INDUSTRIAL APPLICABILITY

A lens array and a camera module including the same according to embodiments may typically be applied to various electronic appliances such as, for example, a vehicle rear camera, a personal computer, a laptop computer, a cellular phone, and a PDA.

The invention claimed is:
1. A lens array, comprising:
a plurality of lenses arranged in an optical-axis direction between an object side and an image side;
a first spacer disposed between the lenses and having an inner width and an outer width, wherein the inner width is smaller than the outer width, first and second lenses of the plurality of lenses being side by side in the optical-axis direction and having different widths; and an elastic member disposed between the first spacer and at least one of the first and second lenses wherein the elastic member includes a first elastic member and a second elastic member, and wherein the first elastic member is attached to the inner width of the first spacer and the second elastic member is attached to the outer width of the first spacer.

2. The lens array according to claim 1, wherein the width of the first lens is smaller than the width of the second lens, and the second lens includes a recessed portion in which the first lens is accommodated.

3. The lens array according to claim 2, wherein the elastic member has an inner diameter that is greater than an inner diameter of the first spacer and an outer diameter that is equal to or smaller than an outer diameter of the first spacer.

4. The lens array according to claim 2, wherein the lenses further include:
   a third lens disposed on the object side of the first and second lenses; and
   a fourth lens disposed on the image side of the second lens.

5. The lens array according to claim 4, further comprising a second spacer disposed between the second lens and the fourth lens.

6. The lens array according to claim 4, wherein the lenses further include a fifth lens disposed on the object side of the third lens, and the lens array further comprises a third spacer disposed between the third lens and the fifth lens.

7. The lens array according to claim 2, wherein the elastic member has a thickness represented as follows:

T>d where, T is the thickness of the elastic member, and d is a tolerance between a lower surface of the first spacer and an upper surface of the first or second lens.

8. The lens array according to claim 2, wherein the first elastic member is fastened to or via an adhesive coupled to at least one of the first spacer and the first lens.

9. The lens array according to claim 2, wherein the second elastic member is fastened to or via an adhesive coupled to at least one of the first spacer and the second lens.

10. The lens array according to claim 2, wherein an upper surface of the second lens is fixed to a second lower surface of the first spacer, and the elastic member is fixed to an upper surface of the first lens.

11. The lens array according to claim 2, wherein the second lower surface is shaped to surround a first lower surface of the first spacer in a plan view.

12. The lens array according to claim 1, wherein the elastic member includes at least one of silicon, rubber, or epoxy.

13. The lens array according to claim 1, wherein the elastic member has a compressible amount ranging from 10% to 50% of a thickness of the elastic member.

14. The lens array according to claim 1, wherein the elastic member has an elastic force that is equal to or greater than a weight of the first and second lenses.

15. The lens array according to claim 1, wherein the elastic member includes a material that absorbs and transmits light.

16. The lens array according to claim 1, further comprising a coating layer configured to coat at least a portion of the elastic member.

17. The lens array according to claim 1, wherein the first spacer is formed of a metal or a plastic.

18. A camera module comprising:
   the lens array according to claim 1;
   a lens barrel in which the lenses are disposed; and
   a housing in which the lens barrel is mounted.

* * * * *